US012544677B2

(12) United States Patent
Liu

(10) Patent No.: US 12,544,677 B2
(45) Date of Patent: Feb. 10, 2026

(54) DETACHABLE SHAFT JOYSTICK AND REMOVAL AND STORAGE METHOD THEREOF

(71) Applicant: Shenzhen Qanba Technology Development Co., Ltd, Shenzhen (CN)

(72) Inventor: Kai Liu, Shenzhen (CN)

(73) Assignee: Shenzhen Qanba Technology Development Co., Ltd., Shenzhen (CN)

( * ) Notice: Subject to any disclaimer, the term of this patent is extended or adjusted under 35 U.S.C. 154(b) by 534 days.

(21) Appl. No.: 18/109,293

(22) Filed: Feb. 14, 2023

(65) Prior Publication Data

US 2023/0364521 A1 Nov. 16, 2023

(30) Foreign Application Priority Data

May 10, 2022 (CN) ......................... 202210507503.2

(51) Int. Cl.
*A63F 13/24* (2014.01)
*A63F 13/98* (2014.01)

(52) U.S. Cl.
CPC .............. *A63F 13/98* (2014.09); *A63F 13/24* (2014.09)

(58) Field of Classification Search
CPC ................................. A63F 13/24; A63F 13/98
See application file for complete search history.

(56) References Cited

U.S. PATENT DOCUMENTS

| | | | | |
|---|---|---|---|---|
| 6,580,418 | B1 * | 6/2003 | Grome | A63F 13/22 345/161 |
| 2004/0095320 | A1 | 5/2004 | Furukawa | |
| 2009/0036189 | A1 * | 2/2009 | Wang | A63F 13/24 463/16 |
| 2010/0011903 | A1 | 1/2010 | Koschke et al. | |
| 2017/0304717 | A1 * | 10/2017 | Huang | G06F 3/0338 |
| 2019/0250723 | A1 | 8/2019 | Chen et al. | |

* cited by examiner

*Primary Examiner* — David L Lewis
*Assistant Examiner* — S. N. H.
(74) *Attorney, Agent, or Firm* — Jose Cherson Weissbrot

(57) ABSTRACT

A detachable shaft joystick and a removal and storage method thereof are provided, which relate to the technical field of game peripherals. The detachable shaft joystick includes a device body and a lever; one end of the lever is detachably assembled in the device body through a bolt; the lever at least includes a plastic shaft and a ball top; an unlocking end of the device body close to the bolt is movably provided with an unlocking hole cap for locking or unlocking the bolt; a first storage cavity and a first storage cover matched with the first storage cavity are arranged on one side of the device body; the first storage cavity is used for storing the removed lever; and spare wear parts are also provided inside the first storage cavity.

20 Claims, 6 Drawing Sheets

DETACHABLE SHAFT JOYSTICK AND REMOVAL AND STORAGE METHOD THEREOF

TECHNICAL FIELD

The present disclosure relates to the technical field of game peripherals, specifically relates to a detachable shaft joystick and a removal and storage method thereof.

BACKGROUND

Shaft joystick is a common component of an electronic game console. By manipulating its buttons and lever, simulated characters on mobile phones, computers and other electronic devices can be controlled to achieve the purpose of playing a game.

In most shaft joysticks, due to the design of a device body, an extremely high protrusion portion is formed by with an exposed ball arm and ball top of the lever. In normal use, a too large and too high shaft joystick is inconvenient to store, transport and carry in travels, and the ball top of the lever is easy to damage. At present, the way to solve this problem on the market is usually to remove the lever on the shaft joystick to reduce the occupied space, but the removed lever and other components also have problems of inconvenient storage and easy loss. In addition, there are no spare parts carrying with the device body for wear lever ball top, lever plastic shaft, cover and the like, thus greatly reducing the use experience of users and the service life of the whole device. Therefore, it is in urgent need for improvement.

SUMMARY

A first objective of the present disclosure is to provide a detachable shaft joystick for the defects and shortcomings in the prior art. The detachable shaft joystick is convenient to remove and reasonable in structure, and has the advantages of reducing the volume of a product, facilitating carrying and transportation, enhancing the user experience and prolonging the service life of a product.

In order to achieve the above objective, the technical solution of the present disclosure is as follows: The detachable shaft joystick includes a device body and a lever; one end of the lever is detachably assembled in the device body through a bolt; the lever at least includes a plastic shaft and a ball top; an unlocking end of the device body close to the bolt is movably provided with an unlocking hole cap for locking or unlocking the bolt; a first storage cavity and a first storage cover matched with the first storage cavity are arranged on one side of the device body; the first storage cavity is used for storing the removed lever; and spare wear parts are also provided inside the first storage cavity.

In a further setting of the present disclosure, a second storage cavity and a second storage cover matched with the second storage cavity are also arranged on the other side of the device body; and the second storage cavity is used for storing a USB data wire.

In a further setting of the present disclosure, the first storage cover and the second storage cover are respectively assembled on the first storage cavity and a second storage cavity through thumb screws.

In a further setting of the present disclosure, the spare wear parts include a spare plastic shaft, a spare cover and at least one spare ball top.

In a further setting of the present disclosure, a slot special for plastic shaft, a slot special for cover, and a slot special for ball top are at least formed in the first storage cavity.

In a further setting of the present disclosure, the ball top is a standard ball top; and the spare ball top at least includes a non-standard ball top.

In a further setting of the present disclosure, a group of wire wrapping posts is also arranged in the second storage cavity; and a wire inlet hole is formed in a side wall of the second storage cavity.

In a further setting of the present disclosure, the unlocking hole cap includes a rotary hole cap piece and a hardware unlocking member;

- a mounting slot is formed in an unlocking end of the device body close to the bolt; at least one opening position for picking and placing the unlocking hole cap and one locking position for preventing the unlocking hole cap from falling off are arranged on the mounting slot.

A second objective of the present disclosure is to provide a removal and storage method of a detachable shaft joystick for the defects and shortcomings in the prior art. The removal and storage method has the advantages of reasonable overall operation, no need for extra removing and storing tools, practicability, quickness and convenience in removal and storage.

In order to achieve the above objective, the technical solution adopted by the present disclosure is as follows: a removal and storage method of a detachable shaft joystick. The method is based on the above detachable shaft joystick and includes:

- S1: rotating the unlocking hole cap to the opening position of the mounting slot, then taking down the unlocking hole cap, unlocking the bolt by using the above hardware unlocking member, and removing the lever from the device body;
- S2: manually unscrewing the thumb screw on the first storage cover to open the first storage cavity; respectively putting the removed lever ball top, lever plastic shaft and cover into the slot special for ball top, the slot special for plastic shaft and slot special for cover; manually screwing the thumb screw located on the first storage cover to cover the first storage cavity;
- S3: manually unscrewing the thumb screw on the second storage cover to open the second storage cavity; connecting the USB data wire from the wire inlet hole, and winding the wire along the wire wrapping post for storage; manually screwing the thumb screw on the second storage cover to cover the second storage cavity; and
- S4: finally aligning the unlocking hole cap with the opening position of the mounting slot, and rotating the unlocking hole cap to the locking position on the mounting slot to complete the mounting.

By the adoption of the above technical solutions, the present disclosure has the following beneficial effects.

1. According to the detachable shaft joystick in the present disclosure, since the unlocking hole cap and the first storage cavity are arranged on the device body, a removing tool of the lever can be obtained from the device body, and the bolt is locked or unlocked to mount and remove the lever. The removed lever can be stored in the first storage cavity. On the one hand, parts are effectively prevented from being lost; the overall volume can be reduced; and users can conveniently store and carry the detachable shaft joystick. On the other hand, the package and transportation costs of the shaft joystick can be reduced, and damage to the lever in the transportation process can be prevented. Furthermore, the spare wear parts are also configured in the first storage cavity, so that a user can select at a will a lever ball top the user likes, which is conductive to enhancing the user experience and also prolonging the service life of a product.

2. According to the removal and storage method in the present disclosure, first, the unlocking hole cap is arranged on the device body; the lever is removed and mounted without an external tool, and the overall operation is convenient, and it is convenient for removal and mounting. Second, the first storage cover and the second storage cover are both mounted by means of the thumb screws, which also require no external tool. In addition, the slot special for ball top, the slot special for plastic shaft and the like are respectively arranged in the first storage cavity to store all the components in different regions according to their types, which effectively avoids displacement or mutual collision of the components in the first storage cavity. The method is quick in removal and mounting and reasonable in storage, and effectively solves the problems of complex removal and inconvenient storage in the prior art.

BRIEF DESCRIPTION OF THE DRAWINGS

To describe the embodiments of the present disclosure or the technical solutions in the existing art more clearly, drawings required to be used in the embodiments or the illustration of the existing art will be briefly introduced below. Obviously, the drawings in the illustration below are only some embodiments of the present disclosure. Those ordinarily skilled in the art also can acquire other drawings according to the provided drawings without doing creative work.

Figure 1:
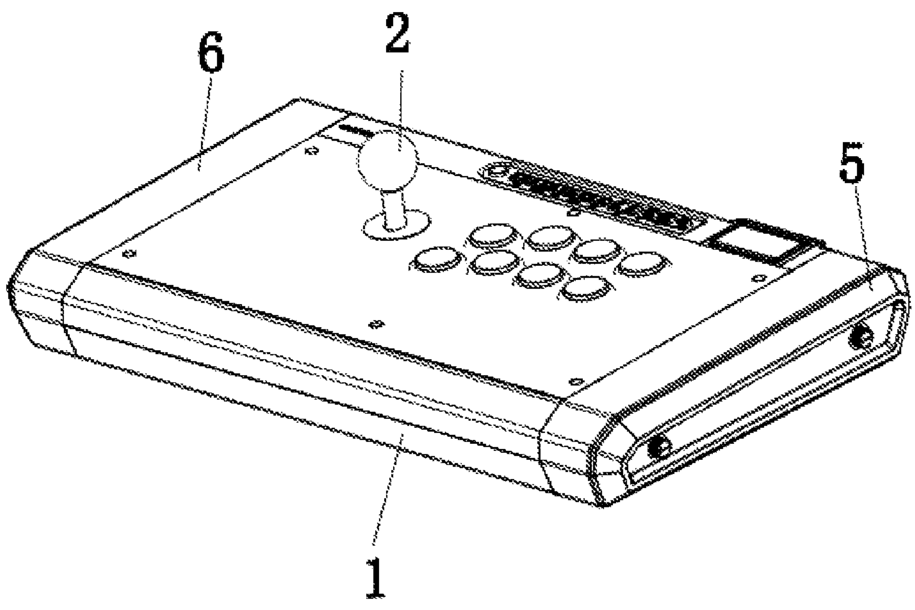
FIG. 1 is a schematic structural diagram of this embodiment.

Numerals in the drawings: 1: device body; 2: lever; 3: bolt; 21: plastic shaft; 22: ball top; 23: cover; 4: unlocking hole cap; 5: first storage cavity; 51: first storage cover; 6: second storage cavity; 61: second storage cover; 10: USB data wire; 62: wire inlet hole; 63: wire wrapping post; 7: thumb screw; 52: slot special for plastic shaft; 53: slot special for ball top; 54: slot special for cover; 41: rotary hole cap piece; 42: hardware unlocking member; 43: mounting slot; 44: opening position; 45: locking position; 01: functional button region; 02: touch region; 03: game button region; 04: hand rest portion; 041: hand supporting region; 042: 45-degree wrist fitting region; 05: antiskid pad; and 06: spare ball top.

DETAILED DESCRIPTION OF THE EMBODIMENTS

The present disclosure is further described in detail below in combination with accompanying drawings.

This specific embodiment is only an explanation of the present disclosure, and it is not a limitation to the present disclosure. After reading this specification, those skilled in the art can make modifications to this embodiment that do not create any contribution as needed, but the modifications shall be protected by the patent law within the scope of the claims of the present disclosure.

In the prior art, main structural components of a shaft joystick include a device body, a lever, a plurality of elastic trigger buttons (silicone buttons or Dome buttons) and s trigger printed circuit board (PCB). The trigger buttons are mounted in a fixed support on the device body, and the trigger PCB is mounted in the device body and located below the fixed support. By means of manipulating and pressing a certain trigger button, the trigger button is compressed and moves toward the trigger PCB to contact the trigger PCB to trigger a corresponding function. The lever is movably connected with the device body. When triggered by a user, the lever will move relative to a lever support to generate a corresponding lever operation signal.

This embodiment relates to a detachable shaft joystick, as shown in FIG. 1 to FIG. 6, including a device body 1 and a lever 2. One end of the lever 2 is detachably assembled in the device body 1 through a bolt 3. The lever 2 at least includes a plastic shaft 21 and a ball top 22; an unlocking end of the device body 1 close to the bolt 3 is movably provided with an unlocking hole cap 4 for locking or unlocking the bolt 3. A first storage cavity 5 and a first storage cover 51 matched with the first storage cavity are arranged on one side of the device body 1. The first storage cavity 5 is used for storing the removed lever 2. Therefore, when the lever 2 is removed or mounted, it is not necessary to open the entire device body 1, but only the built-in unlocking hole cap 4 is taken down. The bolt 3 is locked or unlocked by using the unlocking hole cap 4 to mount or remove the lever 2, thus achieving the characteristics of practicability, quickness, convenient storage and the like. The removed lever 2 can be stored in the first storage cavity 5, so that loss of parts is effectively prevented, the volume of a product is reduced, and it is favorable for storage and transportation of the product.

Figure 2:
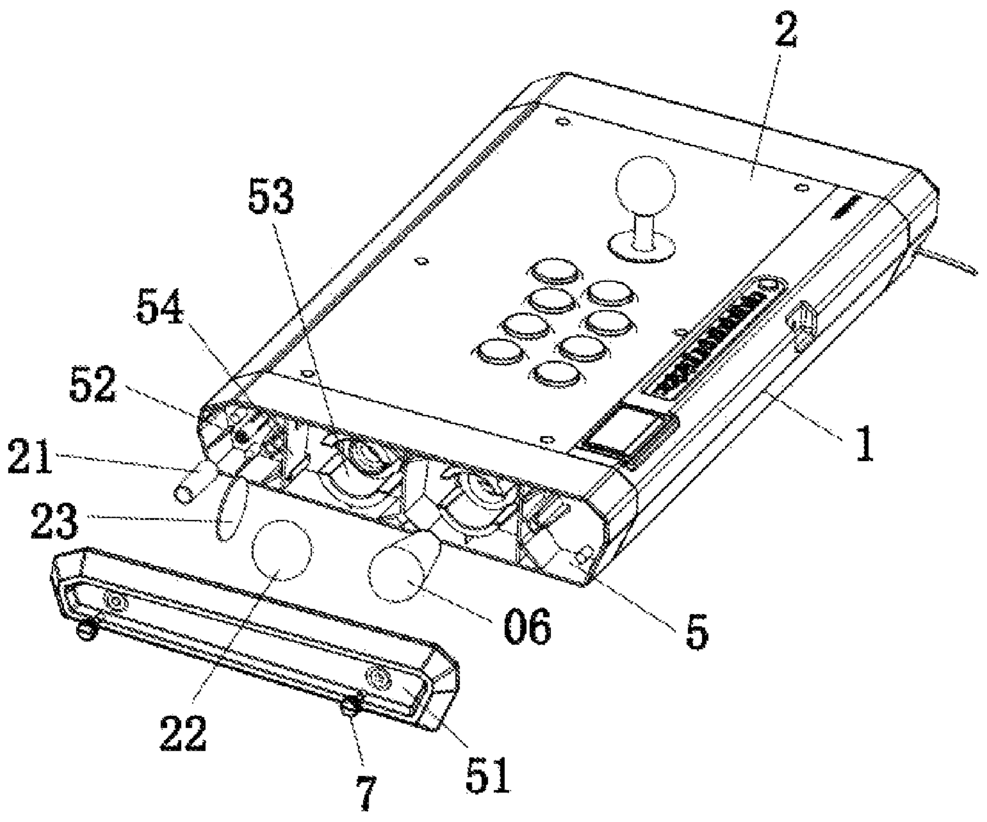
FIG. 2 is a schematic exploded diagram in this embodiment.

It should be noted that as shown in FIG. 2, spare wear parts are also configured in the first storage cavity 5. Since the lever ball top 22, the lever plastic shaft 21, the cover 23 and the like may be possibly worn in use, mounting and removal processes, in order to prolong the service life of the products and reduce after services, manufactures configure spare wear parts in the first storage cavity 5, which can effectively enhance the user experience and improve the favorable impression of the products. In this embodiment, the spare wear parts include a spare plastic shaft 21, a spare cover 23 and at least one spare ball top 06.

Figure 3:
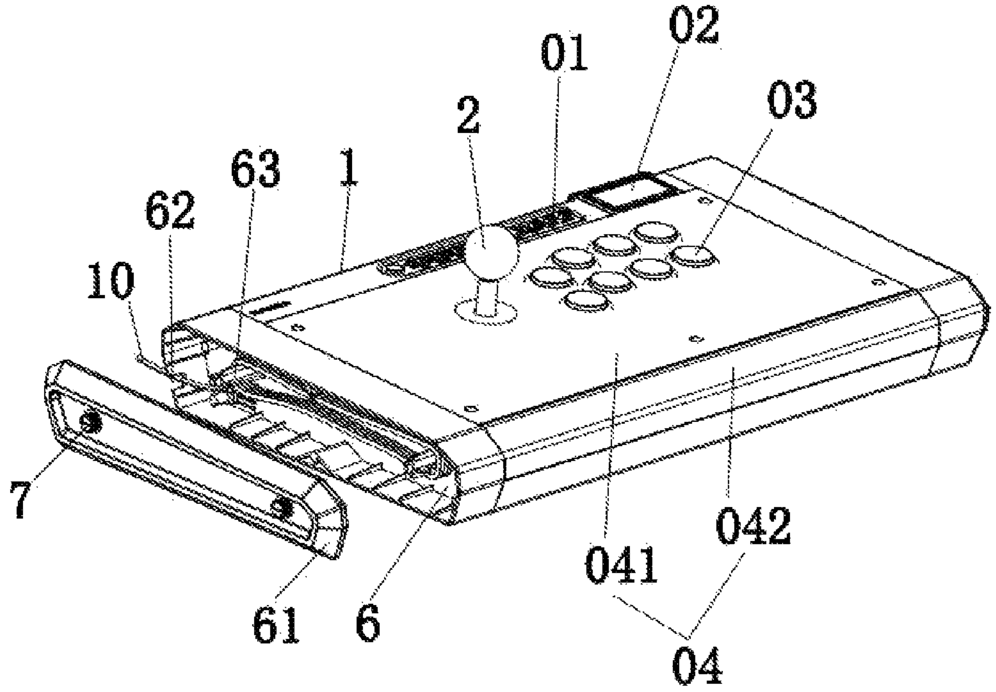
FIG. 3 is another schematic exploded diagram in this embodiment.

In this embodiment, as shown in FIG. 3, a second storage cavity 6 and a second storage cover 61 matched with the second storage cavity are also arranged on the other side of the device body 1. The second storage cavity 6 is used for storing a USB data wire 10. The second storage cavity 6 is close to a wire outlet end of the USB data wire 10 of the lever 2. A side wall of the second storage cavity 6 is provided with a wire inlet hole 62, and is also internally provided with a group of wire wrapping posts 63. During storage, the USB data wire 10 is collected from the wire inlet hole 62 to the second storage cavity 6, and then the USB data wire 10 is coiled along the wire wrapping posts 63, which is conducive to the ordered storage of cables, avoiding clutter and damage, facilitating storage, and protecting the integrity of cables to the largest extent.

As shown in FIG. 2 and FIG. 3, the first storage cover 51 and the second storage cover 61 are respectively assembled on the first storage cavity 5 and a second storage cavity 6 through thumb screws 7. Therefore, the first storage cavity 5 and the second storage cavity 6 are opened or closed by manually locking or unlocking the thumb screws 7, without any tool, so the operation is very convenient. Further, an outer surface of each of the first storage cover 51 and the second storage cover 61 is provided with an inwards sunken plane, and end surfaces assembled with the thumb screws 7 are flush with end surfaces of two sides of the device body 1, thus effectively avoiding scratches and bumps caused by the thumb screws 7 relative to the outside during use, which is safer to use.

It should be noted that the lever ball top 22 provided on the shaft joystick is a standard ball top. To further enrich the diversity of the lever and meet the use needs of different users, the spare ball top 06 configured in this embodiment at least includes a non-standard ball top, such as a conical ball top. Therefore, a user can select a corresponding target ball top according to an actual use need.

As shown in FIG. 2, a slot 52 special for plastic shaft, a slot 53 special for ball top and a slot 54 special for cover are at least formed in the first storage cavity 5. A columnar supporting portion is arranged in the slot 52 special for plastic shaft. An annular supporting portion is arranged in the slot 53 special for ball top. The slot 54 special for cover is a T-slot. In addition, the first storage cavity 5 can also be equipped with a spare thumb screw 7. All the components can be stored in different regions according to their types, which facilitates fetching. At the same time, displacement or mutual collision of the components in the first storage cavity 5 is effectively avoided, which ensures safe storage of the components.

According to the shaft joystick, the lever ball top 22, lever plastic shaft 21 and lever cover 23 are disassembled and stored in different regions. The operation is simple, and the storage and protection of the accessories by the device 1 are ingeniously achieved. On the one hand, loss of parts is effectively avoided, which is conducive to reducing the overall volume and facilitating better storage and carrying by users. On the other hand, the package and transportation costs of the shaft joystick can be reduced, and the lever 2 can be prevented from being damaged during transportation. Furthermore, the spare wear parts are also configured in the first storage cavity 5, so that a user can select at a will a lever ball top 22 the user likes, which is conductive to enhancing the user experience and also prolonging the service life of a product.

Figure 4:
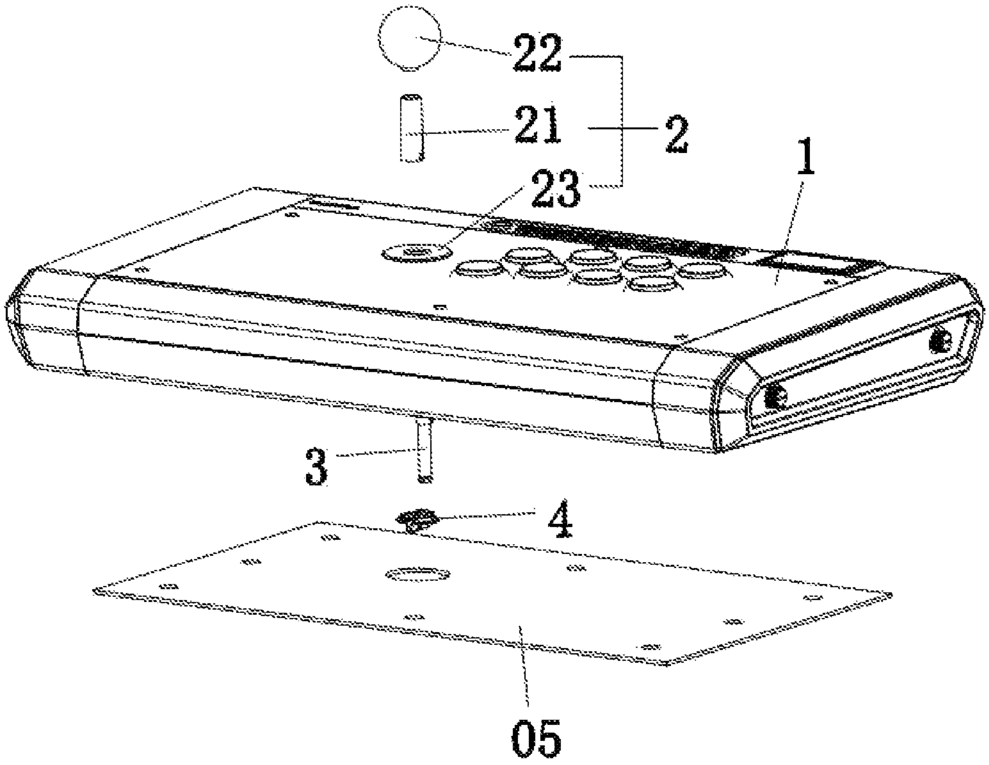
FIG. 4 is still another schematic exploded diagram in this embodiment.
Figure 5:
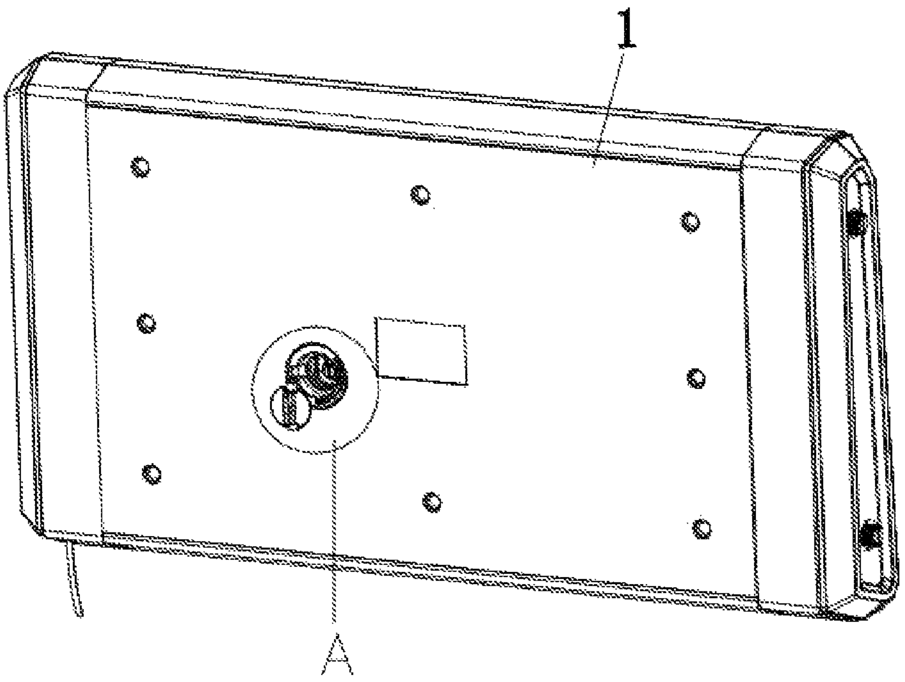
FIG. 5 is another schematic exploded diagram in this embodiment.
Figure 6:
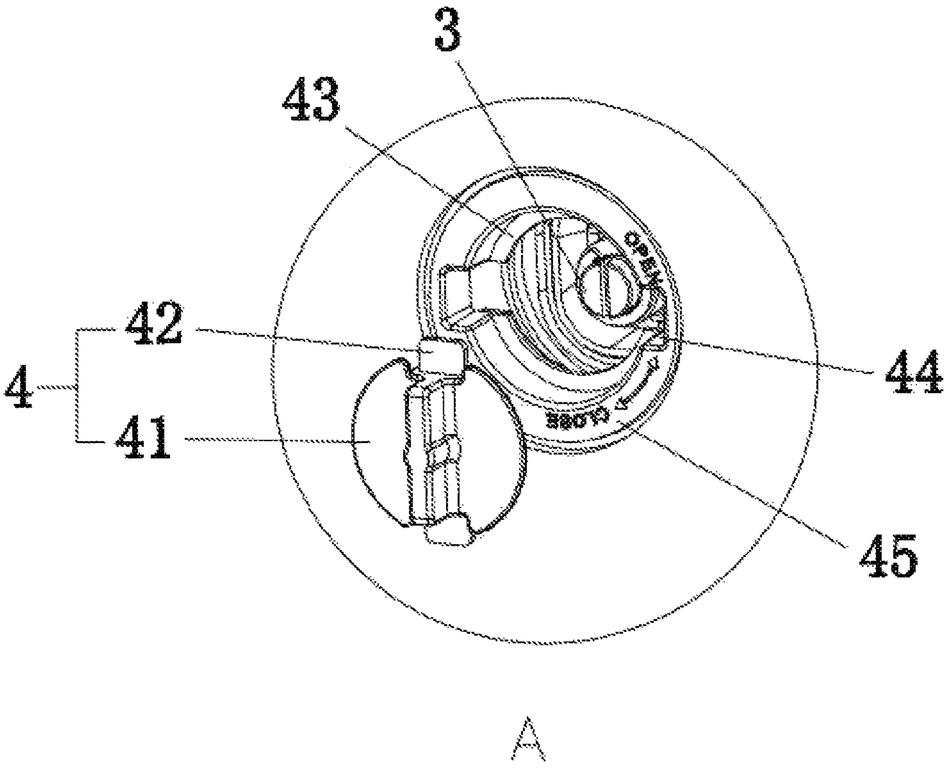
FIG. 6 is a schematic enlarged diagram of the part A in FIG. 5.

As shown in FIG. 4 to FIG. 6, the unlocking hole cap 4 includes a rotary hole cap piece 41 and a hardware unlocking member 42. Specifically, the bolt 3 in this embodiment is a slot type bolt 3, so the hardware unlocking member 42 on the unlocking hole cap 4 is slot type. The rotary hole cap piece 41 is provided with a holding portion for user operation, and the slot type hardware unlocking member 42 is symmetrically arranged on the rotary hole cap piece 41. A mounting slot 43 is formed in an unlocking end of the device body 1 close to the bolt 3. At least one opening position 44 for picking and placing the unlocking hole cap 4 and one locking position 45 for preventing the unlocking hole cap 4 from falling off are arranged on the mounting slot 43.

As shown in FIG. 4 to FIG. 6, to remove the lever 2, the rotary hole cap piece 41 is held and rotated a certain angle to the left or the right until the hardware unlocking member 42 is aligned with the opening position 44 of the mounting slot 43; the entire unlocking hole cap 4 is taken down, so that the unlocking end of the bolt 3 is exposed in the mounting slot 43; and a user can unscrew the bolt 3 using the hardware unlocking member 42 to remove the lever 2. After the removal is completed, the hardware unlocking member 42 is aligned with the opening position 44 and is inserted into the mounting slot 43; the rotary hole cap piece 41 is operated and rotated a certain angle to the locking position 45 to complete mounting of the unlocking hole cap 4.

In this embodiment, as shown in FIG. 3, a surface of the device body 1 is provided with a functional button region 01, a touch region 02, and a game button region 03. The functional button region 01 is arranged in the outermost row of the shaft joystick to control the selection of game functions. The touch region 02 is arranged at the upper right side of the shaft joystick to increase the touch control of a game. The game button region 03 is arranged at the left center and is symmetric with the lever 2. One side of the device body 1 is provided with a hand supporting portion 04. The hand supporting portion 04 includes a hand supporting region 041 and a 45-degree wrist fitting region 042.

As shown in FIG. 4, a bottom of the device body 1 is provided with a full surface antiskid pad 05. The hand supporting region 041 is arranged below the lever 2 and the game button region 03. The 45-degree wrist fitting region 042 is arranged on an inner side the shaft joystick and connected with the hand supporting region 041. When in use, the bottom antiskid pad 05 contacts a bearing surface to play a good antiskid role, making the shaft joystick not easy to move, and the wrist of the user is successively supported by the 45-degree wrist fitting region 042 and the hand supporting region 041, which is conductive to uniform supporting of the hand, improving the operation convenience of the hand.

This embodiment further relates to a removal and storage method of a detachable shaft joystick. The method is based on the above detachable shaft joystick, referring to FIG. 1 to FIG. 6, including:

S1: rotating the unlocking hole cap 4 to the opening position 44 of the mounting slot 43, then taking down the unlocking hole cap 4, unlocking the bolt 3 by using the above hardware unlocking member 42, and removing the lever 2 from the device body 1.

The removed lever 2 at least includes a ball top 22, a plastic shaft 21 and a cover 23. Specifically, in this embodiment, an internal thread hole is formed in the ball top 22. The locking end of the bolt 3 is assembled with the internal thread hole of the ball top 22. The plastic shaft 21 sleeves an upper middle section of the bolt 3, and one end of the plastic shaft 21 resists against the ball top 22, and the other end resists against the lever support inside the device body 1. In this embodiment, the ball top 22, the plastic shaft 21 and the bolt 3 can also be assembled in other ways.

S2: manually unscrewing the thumb screw 7 on the first storage cover 51 to open the first storage cavity 5; respectively putting the removed lever ball top 22, lever plastic shaft 21 and cover 23 into the slot 53 special for ball top, the slot 52 special for plastic shaft and slot 54 special for cover; manually screwing the thumb screw 7 located on the first storage cover 51 to cover the first storage cavity 5.

In this step, all the components can be stored in different regions according to their types, so that a user can clearly pick and place the components, and displacement or mutual collision of the components in the first storage cavity 5 is effectively avoided.

S3: manually unscrewing the thumb screw 7 on the second storage cover 61 to open the second storage cavity 6; connecting the USB data wire 10 from the wire inlet hole 62, and winding the wire along the wire wrapping post 63 for storage; manually screwing the thumb screw 7 on the second storage cover 61 to cover the second storage cavity 6.

S4: finally aligning the unlocking hole cap 4 with the opening position 44 of the mounting slot 43, and rotating the unlocking hole cap to the locking position 45 on the mounting slot 43 to complete the mounting.

The working principle of the present disclosure is approximately as follows: In this embodiment, since the unlocking hole cap 4 and the first storage cavity 5 are arranged on the device body 1, a removing tool for the lever 2 can be obtained from the device body 1, and the bolt 3 is locked or unlocked to mount and remove the lever 2. The removed lever 2 can be stored in the first storage cavity 5. On the one hand, parts are effectively prevented from being lost; the overall volume can be reduced; and users can conveniently store and carry the detachable shaft joystick. On the other hand, the package and transportation costs of the shaft joystick can be reduced, and damage to the lever 2 in the transportation process can be prevented. Furthermore, the spare wear parts are also configured in the first storage cavity 5, so that a user can select at a will a lever ball top 22 the user likes, which is conductive to enhancing the user experience and also prolonging the service life of a product. The lever 2, the first storage cover 51 and the second storage cover 61 can be all removed and mounted without an external tool, and all the removed components are respectively stored in different regions in the first storage cavity 5 according to their types, which effectively avoids displacement or mutual collision of the components in the first storage cavity 5. The overall shaft joystick is quick in removal and mounting and reasonable in storage, and effectively solves the problems of complex removal and inconvenient storage in the prior art.

The above is only used to explain the technical solution of the present disclosure, but not to limit the technical solution. Other modifications or equivalent substitutions made by those of ordinary skill in the art to the technical solution of the present disclosure shall fall within the scope of the claims of the present disclosure without departing from the spirit and scope of the technical solution of the present disclosure.

What is claimed is:

1. A detachable shaft joystick, comprising a device body (1) and a lever (2), wherein one end of the lever (2) is detachably assembled in the device body (1) through a bolt (3), and the lever (2) at least comprises a plastic shaft (21) and a ball top (22);

an unlocking end of the device body (1) close to the bolt (3) is movably provided with an unlocking hole cap (4) for locking or unlocking the bolt (3);

a first storage cavity (5) and a first storage cover (51) matched with the first storage cavity (5) are arranged on one side of the device body (1); the first storage cavity (5) is used for storing the removed lever (2); and spare wear parts are also provided inside the first storage cavity (5).

2. The detachable shaft joystick according to claim 1, wherein a second storage cavity (6) and a second storage cover (61) matched with the second storage cavity are also arranged on the other side of the device body (1); and the second storage cavity (6) is used for storing a USB data wire (10).

3. The detachable shaft joystick according to claim 2, wherein the first storage cover (51) and the second storage cover (61) are respectively assembled on the first storage cavity (5) and a second storage cavity (6) through thumb screws (7).

4. The detachable shaft joystick according to claim 1, wherein the spare wear parts comprise a spare plastic shaft (21), a spare cover (23) and at least one spare ball top (06).

5. The detachable shaft joystick according to claim 4, wherein a slot (52) special for plastic shaft, a slot (54) special for cover, and a slot (53) special for ball top are at least formed in the first storage cavity (5).

6. The detachable shaft joystick according to claim 4, wherein the ball top (22) is a standard ball top; and the spare ball top (06) at least comprises a non-standard ball top.

7. The detachable shaft joystick according to claim 2, wherein a group of wire wrapping posts (63) is also arranged in the second storage cavity (6); and a wire inlet hole (62) is formed in a side wall of the second storage cavity (6).

8. The detachable shaft joystick according to claim 1, wherein the unlocking hole cap (4) comprises a rotary hole cap piece (41) and a hardware unlocking member (42);

a mounting slot (43) is formed in an unlocking end of the device body (1) close to the bolt (3); at least one opening position (44) for picking and placing the unlocking hole cap (4) and one locking position (45) for preventing the unlocking hole cap (4) from falling off are arranged on the mounting slot (43).

9. The detachable shaft joystick according to claim 8, wherein the bolt (3) is a slot type bolt; the hardware unlocking member (42) on the unlocking hole cap (4) is slot type; a holding portion is arranged on the rotary hole cap piece (41); the slot type hardware unlocking member (42) is symmetrically arranged on the rotary hole cap piece (41).

10. The detachable shaft joystick according to claim 8, wherein the rotary hole cap piece (41) is held, so that the rotary hole cap piece (41) is rotated a certain angle to the left or the right until the hardware unlocking member (42) is aligned with the opening position (44) of the mounting slot (43); the entire unlocking hole cap (4) is taken down, so that the unlocking end of the bolt (3) is exposed in the mounting slot (43); the bolt (3) is unscrewed using the hardware unlocking member (42) to remove the lever (2); the hardware unlocking member (42) is aligned with the opening position (44) and is inserted into the mounting slot (43); the rotary hole cap piece (41) is operated, so that the rotary hole cap piece (41) is rotated a certain angle to the locking position (45) to complete mounting of the unlocking hole cap (4).

11. A removal ad storage method of a detachable shaft joystick, wherein the method is based on the detachable shaft joystick according to claim 1, and comprises:

S1: rotating the unlocking hole cap (4) to the opening position (44) of the mounting slot (43), then taking down the unlocking hole cap (4), unlocking the bolt (3) by using the above hardware unlocking member (42), and removing the lever (2) from the device body (1);

S2: manually unscrewing the thumb screw (7) on the first storage cover (51) to open the first storage cavity (5); respectively putting the removed lever ball top (22), lever plastic shaft (21) and cover (23) into the slot (53) special for ball top, the slot (52) special for plastic shaft and slot (54) special for cover; manually screwing the thumb screw (7) located on the first storage cover (51) to cover the first storage cavity (5);

S3: manually unscrewing the thumb screw (7) on the second storage cover (61) to open the second storage cavity (6); connecting the USB data wire (10) from the wire inlet hole (62), and winding the wire along the wire wrapping post (63) for storage; manually screwing the thumb screw (7) on the second storage cover (61) to cover the second storage cavity (6); and S4: finally aligning the unlocking hole cap (4) with the opening position (44) of the mounting slot (43), and rotating the unlocking hole cap to the locking position (45) on the mounting slot (43) to complete the mounting.

12. A removal ad storage method of a detachable shaft joystick, wherein the method is based on the detachable shaft joystick according to claim 2, and comprises:

S1: rotating the unlocking hole cap (4) to the opening position (44) of the mounting slot (43), then taking down the unlocking hole cap (4), unlocking the bolt (3) by using the above hardware unlocking member (42), and removing the lever (2) from the device body (1);

S2: manually unscrewing the thumb screw (7) on the first storage cover (51) to open the first storage cavity (5); respectively putting the removed lever ball top (22), lever plastic shaft (21) and cover (23) into the slot (53) special for ball top, the slot (52) special for plastic shaft and slot (54) special for cover; manually screwing the thumb screw (7) located on the first storage cover (51) to cover the first storage cavity (5);

S3: manually unscrewing the thumb screw (7) on the second storage cover (61) to open the second storage cavity (6); connecting the USB data wire (10) from the wire inlet hole (62), and winding the wire along the wire wrapping post (63) for storage; manually screwing the thumb screw (7) on the second storage cover (61) to cover the second storage cavity (6); and S4: finally aligning the unlocking hole cap (4) with the opening position (44) of the mounting slot (43), and rotating the unlocking hole cap to the locking position (45) on the mounting slot (43) to complete the mounting.

13. A removal ad storage method of a detachable shaft joystick, wherein the method is based on the detachable shaft joystick according to claim 3, and comprises:

S1: rotating the unlocking hole cap (4) to the opening position (44) of the mounting slot (43), then taking down the unlocking hole cap (4), unlocking the bolt (3) by using the above hardware unlocking member (42), and removing the lever (2) from the device body (1);

S2: manually unscrewing the thumb screw (7) on the first storage cover (51) to open the first storage cavity (5); respectively putting the removed lever ball top (22), lever plastic shaft (21) and cover (23) into the slot (53) special for ball top, the slot (52) special for plastic shaft and slot (54) special for cover; manually screwing the thumb screw (7) located on the first storage cover (51) to cover the first storage cavity (5);

S3: manually unscrewing the thumb screw (7) on the second storage cover (61) to open the second storage cavity (6); connecting the USB data wire (10) from the wire inlet hole (62), and winding the wire along the wire wrapping post (63) for storage; manually screwing the thumb screw (7) on the second storage cover (61) to cover the second storage cavity (6); and S4: finally aligning the unlocking hole cap (4) with the opening position (44) of the mounting slot (43), and rotating the unlocking hole cap to the locking position (45) on the mounting slot (43) to complete the mounting.

14. A removal ad storage method of a detachable shaft joystick, wherein the method is based on the detachable shaft joystick according to claim 4, and comprises:

S1: rotating the unlocking hole cap (4) to the opening position (44) of the mounting slot (43), then taking down the unlocking hole cap (4), unlocking the bolt (3) by using the above hardware unlocking member (42), and removing the lever (2) from the device body (1);

S2: manually unscrewing the thumb screw (7) on the first storage cover (51) to open the first storage cavity (5); respectively putting the removed lever ball top (22), lever plastic shaft (21) and cover (23) into the slot (53) special for ball top, the slot (52) special for plastic shaft and slot (54) special for cover; manually screwing the thumb screw (7) located on the first storage cover (51) to cover the first storage cavity (5);

S3: manually unscrewing the thumb screw (7) on the second storage cover (61) to open the second storage cavity (6); connecting the USB data wire (10) from the wire inlet hole (62), and winding the wire along the wire wrapping post (63) for storage; manually screwing the thumb screw (7) on the second storage cover (61) to cover the second storage cavity (6); and S4: finally aligning the unlocking hole cap (4) with the opening position (44) of the mounting slot (43), and rotating the unlocking hole cap to the locking position (45) on the mounting slot (43) to complete the mounting.

15. A removal ad storage method of a detachable shaft joystick, wherein the method is based on the detachable shaft joystick according to claim 5, and comprises:

S1: rotating the unlocking hole cap (4) to the opening position (44) of the mounting slot (43), then taking down the unlocking hole cap (4), unlocking the bolt (3) by using the above hardware unlocking member (42), and removing the lever (2) from the device body (1);

S2: manually unscrewing the thumb screw (7) on the first storage cover (51) to open the first storage cavity (5); respectively putting the removed lever ball top (22), lever plastic shaft (21) and cover (23) into the slot (53) special for ball top, the slot (52) special for plastic shaft and slot (54) special for cover; manually screwing the thumb screw (7) located on the first storage cover (51) to cover the first storage cavity (5);

S3: manually unscrewing the thumb screw (7) on the second storage cover (61) to open the second storage cavity (6); connecting the USB data wire (10) from the wire inlet hole (62), and winding the wire along the wire wrapping post (63) for storage; manually screwing the thumb screw (7) on the second storage cover (61) to cover the second storage cavity (6); and S4: finally aligning the unlocking hole cap (4) with the opening position (44) of the mounting slot (43), and rotating the unlocking hole cap to the locking position (45) on the mounting slot (43) to complete the mounting.

16. A removal ad storage method of a detachable shaft joystick, wherein the method is based on the detachable shaft joystick according to claim 6, and comprises:

S1: rotating the unlocking hole cap (4) to the opening position (44) of the mounting slot (43), then taking down the unlocking hole cap (4), unlocking the bolt (3) by using the above hardware unlocking member (42), and removing the lever (2) from the device body (1);

S2: manually unscrewing the thumb screw (7) on the first storage cover (51) to open the first storage cavity (5); respectively putting the removed lever ball top (22), lever plastic shaft (21) and cover (23) into the slot (53) special for ball top, the slot (52) special for plastic shaft and slot (54) special for cover; manually screwing the thumb screw (7) located on the first storage cover (51) to cover the first storage cavity (5);

S3: manually unscrewing the thumb screw (7) on the second storage cover (61) to open the second storage cavity (6); connecting the USB data wire (10) from the wire inlet hole (62), and winding the wire along the wire wrapping post (63) for storage; manually screwing the thumb screw (7) on the second storage cover (61) to cover the second storage cavity (6); and S4: finally aligning the unlocking hole cap (4) with the opening position (44) of the mounting slot (43), and rotating the unlocking hole cap to the locking position (45) on the mounting slot (43) to complete the mounting.

17. A removal ad storage method of a detachable shaft joystick, wherein the method is based on the detachable shaft joystick according to claim 7, and comprises:

S1: rotating the unlocking hole cap (4) to the opening position (44) of the mounting slot (43), then taking down the unlocking hole cap (4), unlocking the bolt (3) by using the above hardware unlocking member (42), and removing the lever (2) from the device body (1);

S2: manually unscrewing the thumb screw (7) on the first storage cover (51) to open the first storage cavity (5); respectively putting the removed lever ball top (22), lever plastic shaft (21) and cover (23) into the slot (53) special for ball top, the slot (52) special for plastic shaft and slot (54) special for cover; manually screwing the thumb screw (7) located on the first storage cover (51) to cover the first storage cavity (5);

S3: manually unscrewing the thumb screw (7) on the second storage cover (61) to open the second storage cavity (6); connecting the USB data wire (10) from the wire inlet hole (62), and winding the wire along the wire wrapping post (63) for storage; manually screwing the thumb screw (7) on the second storage cover (61) to cover the second storage cavity (6); and S4: finally aligning the unlocking hole cap (4) with the opening position (44) of the mounting slot (43), and rotating the unlocking hole cap to the locking position (45) on the mounting slot (43) to complete the mounting.

18. A removal ad storage method of a detachable shaft joystick, wherein the method is based on the detachable shaft joystick according to claim 8, and comprises:

S1: rotating the unlocking hole cap (4) to the opening position (44) of the mounting slot (43), then taking down the unlocking hole cap (4), unlocking the bolt (3) by using the above hardware unlocking member (42), and removing the lever (2) from the device body (1);

S2: manually unscrewing the thumb screw (7) on the first storage cover (51) to open the first storage cavity (5); respectively putting the removed lever ball top (22), lever plastic shaft (21) and cover (23) into the slot (53) special for ball top, the slot (52) special for plastic shaft and slot (54) special for cover; manually screwing the thumb screw (7) located on the first storage cover (51) to cover the first storage cavity (5);

S3: manually unscrewing the thumb screw (7) on the second storage cover (61) to open the second storage cavity (6); connecting the USB data wire (10) from the wire inlet hole (62), and winding the wire along the wire wrapping post (63) for storage; manually screwing the thumb screw (7) on the second storage cover (61) to cover the second storage cavity (6); and S4: finally aligning the unlocking hole cap (4) with the opening position (44) of the mounting slot (43), and rotating the unlocking hole cap to the locking position (45) on the mounting slot (43) to complete the mounting.

19. A removal ad storage method of a detachable shaft joystick, wherein the method is based on the detachable shaft joystick according to claim 9, and comprises:

S1: rotating the unlocking hole cap (4) to the opening position (44) of the mounting slot (43), then taking down the unlocking hole cap (4), unlocking the bolt (3) by using the above hardware unlocking member (42), and removing the lever (2) from the device body (1);

S2: manually unscrewing the thumb screw (7) on the first storage cover (51) to open the first storage cavity (5); respectively putting the removed lever ball top (22), lever plastic shaft (21) and cover (23) into the slot (53) special for ball top, the slot (52) special for plastic shaft and slot (54) special for cover; manually screwing the thumb screw (7) located on the first storage cover (51) to cover the first storage cavity (5);

S3: manually unscrewing the thumb screw (7) on the second storage cover (61) to open the second storage cavity (6); connecting the USB data wire (10) from the wire inlet hole (62), and winding the wire along the wire wrapping post (63) for storage; manually screwing the thumb screw (7) on the second storage cover (61) to cover the second storage cavity (6); and S4: finally aligning the unlocking hole cap (4) with the opening position (44) of the mounting slot (43), and rotating the unlocking hole cap to the locking position (45) on the mounting slot (43) to complete the mounting.

20. A removal ad storage method of a detachable shaft joystick, wherein the method is based on the detachable shaft joystick according to claim 10, and comprises:

S1: rotating the unlocking hole cap (4) to the opening position (44) of the mounting slot (43), then taking down the unlocking hole cap (4), unlocking the bolt (3) by using the above hardware unlocking member (42), and removing the lever (2) from the device body (1);

S2: manually unscrewing the thumb screw (7) on the first storage cover (51) to open the first storage cavity (5); respectively putting the removed lever ball top (22), lever plastic shaft (21) and cover (23) into the slot (53) special for ball top, the slot (52) special for plastic shaft and slot (54) special for cover; manually screwing the thumb screw (7) located on the first storage cover (51) to cover the first storage cavity (5);

S3: manually unscrewing the thumb screw (7) on the second storage cover (61) to open the second storage cavity (6); connecting the USB data wire (10) from the wire inlet hole (62), and winding the wire along the wire wrapping post (63) for storage; manually screwing the thumb screw (7) on the second storage cover (61) to cover the second storage cavity (6); and S4: finally aligning the unlocking hole cap (4) with the opening position (44) of the mounting slot (43), and rotating the unlocking hole cap to the locking position (45) on the mounting slot (43) to complete the mounting.

* * * * *